Oct. 5, 1965    W. C. SPROULL    3,210,028
CONTROL APPARATUS
Filed Sept. 27, 1962

INVENTOR.
WILLIAM C. SPROULL
BY
ATTORNEY

United States Patent Office 3,210,028
Patented Oct. 5, 1965

3,210,028
CONTROL APPARATUS
William C. Sproull, Wayzata, Minn., assignor to Honeywell Inc., a corporation of Delaware
Filed Sept. 27, 1962, Ser. No. 226,617
3 Claims. (Cl. 244—77)

This invention relates generally to automatic guidance of an aircraft or other vehicle onto and along a predetermined path, and more particularly to apparatus coupling the necessary radio signals to the automatic pilot aboard an aircraft so that the aircraft is automatically controlled to approach a radio beam, and automatically controlled to follow said radio beam.

A problem in automatically controlling an aircraft to approach a path defined by a radio beam involves approaching the beam as steeply as possible, while at the same time minimizing overshoot and the resulting oscillatory correction. A method which is presently quite common utilizes signals representing the lateral displacement of the aircraft from the beam, time rate of change of displacement, angle of bank, and the heading of the aircraft relative to the heading of the radio beam. However, in past systems using a heading error signal it has been common to use the heading error signal continuously for control purposes during the approach to the radio beam.

The present invention is primarily concerned with the use of the heading error signal to obtain the optimum control of the aircraft or other vehicle in approaching and riding along a radio beam. This optimum control is obtained firstly by delaying the effectiveness of the heading error signal until it reaches a predetermined level, whereby an aircraft is allowed to approach the radio beam at a steep angle, and secondly while riding the beam, heading compensation for cross wind, viz., crab angle, is automatic by suitably filtering the heading signal.

It is therefore a primary object of this invention to provide a simple way of automatically delaying the effectiveness of a heading error signal in controlling an aircraft in the early phase of an approach to a radio beam.

It is another object of this invention to automatically delay the effectiveness of a heading error signal in controlling an aircraft in the early phase of an approach to a radio beam.

It is another object to provide automatic cross wind compensation by blocking or delaying the long term heading error signal in controlling an aircraft while riding along a beam.

Various other objects and advantages of the invention will appear from the following description of one embodiment of the invention, and the novel features thereof will be particularly pointed out hereinafter in connection with the appended claims.

Figure 1:
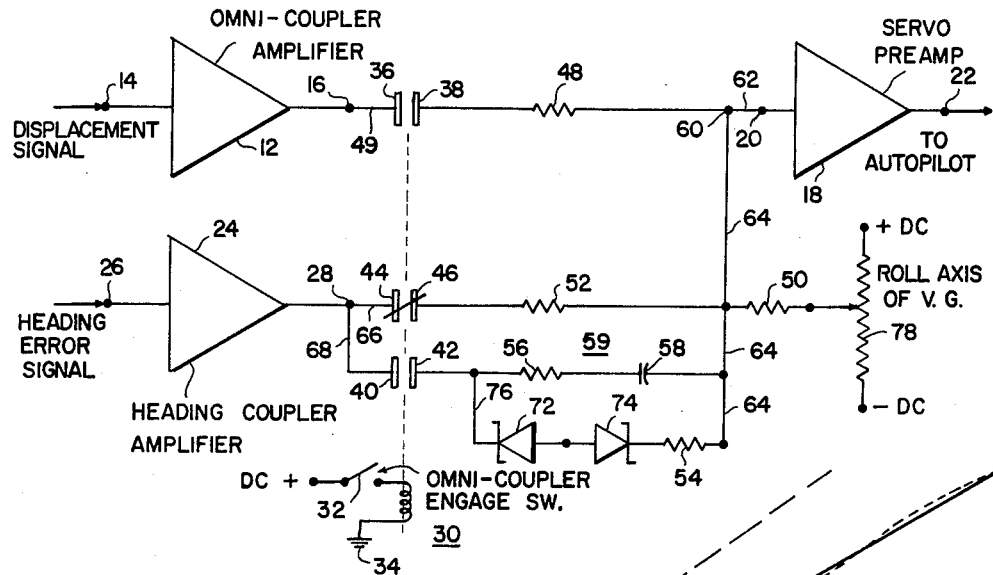
Figure 2:
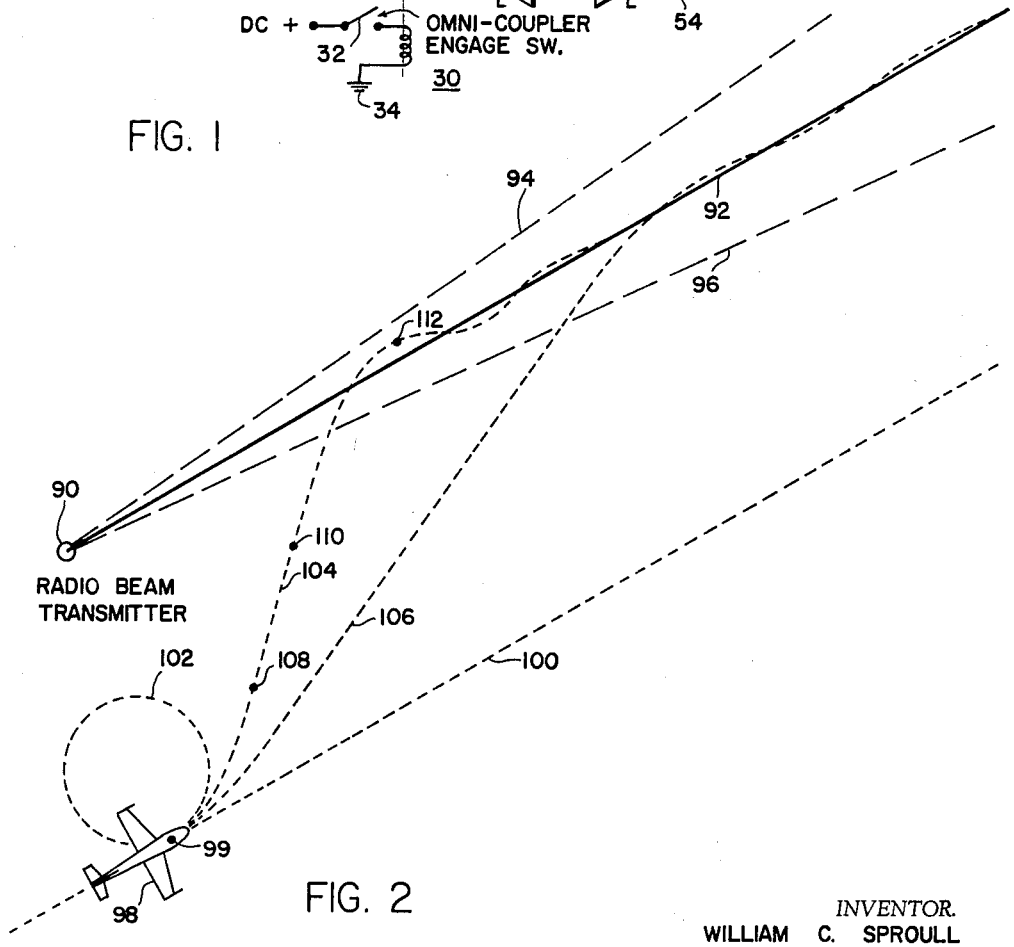

The invention will be explained with the aid of the accompanying drawings, wherein:

FIGURE 1 is a schematic of an omnicoupler used in coupling various control signals to the automatic pilot of an aircraft; and FIGURE 2 represents a plan view of the various paths an aircraft might follow in an automatic approach, one path being effected by the subject invention, the other path not so effected.

Referring to FIGURE 1 there is shown an omni-range signal coupler consisting of an omnicoupler amplifier 12 with input side 14 and output side 16. In the embodiment shown, input side 14 would be connected to a suitable omni-radio beam receiver such as the Collins 51X–2 V.H.F. navigational receiver which supplies a D.C. output signal having a magnitude dependent upon the lateral displacement of an aircraft or other vehicle from a radio beam and a polarity dependent upon which side of the beam the aircraft is on. Amplifier 12 is like that in a pending patent application of Daniel J. Sikorra, Serial No. 79,350, filed December 29, 1960, now Patent 3,144,564, entitled "Control Apparatus," and assigned to the assignee of the instant invention. The amplifier 12 produces a D.C. output signal at side 16 which is substantially proportional to the lateral displacement and time rate of change of lateral displacement of the aircraft with respect to the radio beam. Included in the coupler is servo preamplifier 18, with input side 20 and output side 22, and a heading coupler amplifier 24 with input side 26 and output side 28; both are like that disclosed in a pending patent application of Daniel J. Sikorra, Serial No. 75,762, filed December 14, 1960, entitled "Stabilized Transistor Amplifier," assigned to the assignee of the instant invention. One terminal of a winding of a coupler engage relay 30 is connected to a source of voltage aboard the aircraft through a selectively operable engage switch 32, and the other terminal of the winding is connected to ground 34. Relay 30 has three pairs of contacts, namely normally open contact pairs 36, 38, and 40, 42, and normally closed contact pair 44, 46.

Resistors 48, 50, 52, and 54 are signal summing resistors connected to a summing conductor 64 of an amplifier control network. Resistor 56 and capacitor 58, in series connection form a high-pass network 59. Input side 26 of amplifier 24 is connected to a source of D.C. or demodulated A.C., sensed heading error signal e.g., like that provided by a directional or heading gyroscope of conventional type as in a patent to Kellogg 2,313,350, and input terminal 20 of amplifier 18 is connected to summing point or terminal 60 of summing conductor 64 through conductor 62. Conductor 49 connects output side 16 of amplifier 12 to relay contact 36, resistor 48 connects relay contact 38 to summing point 60. The output side 28 of amplifier 24 is connected to contact 44 of normally closed contact pair 44, 46 through conductor 66, and to contact 40 of normally open contact pair 40, 42 through conductor 68. Contact 46 is connected to summing point 60, via summing conductor 64, through summing resistor 52. Contact 42 is connected to the summing point 60, via conductor 64, through the high-pass network 59 consisting of resistor 56 in series with capacitor 58. A series circuit consisting of zener diodes 72, 74 connected back to back and summing resistor 54 is in parallel connection with the high-pass network 59. The cathode of zener diode 72 is connected to contact 42 through conductor 76, the anode of diode 72 is connected to the anode of diode 74, and the cathode of diode 74 is connected to summing point 60, via conductor 64, through summing resistor 54. Potentiometer 78 represents the voltage pickoff from a vertical gyro, or other suitable roll attitude responsive device, and provides a signal representing the bank angle of the aircraft. A positive source of voltage is connected to one end of potentiometer 78 and a negative source of potential is connected to the opposite end. The wiper arm of potentiometer 78 is connected to summing point 60, via conductor 64 through summing resistor 50. The output side 22 of amplifier 18 is connected to a known roll channel of an autopilot installed aboard the aircraft.

Referring to FIGURE 2, there is shown a plan view of an aircraft and various flight paths it might follow in an approach to a radio beam or ground track. Transmitter 90 transmits a radio beam which, for purposes of explanation, defines a path or course 92. The dotted lines 94, 96 are shown to represent the fact that the radio beam does diverge to a certain extent. Aircraft 98 is shown at point 99 following a heading along path 100. Path 100 is parallel to the path described by radio beam 92. Paths 102, 104, and 106 represent various courses aircraft 98 might take in response to a radio or omni-beam signal in making an automatic approach to beam 92, and will be useful in describing the operation of the invention.

*Operation*

Assume that the pilot of aircraft 98 desires to automatically approach and thereafter ride along beam path 92. Before switching in the omnicoupler, the pilot, say by operation of a heading selector as in Kellogg above, would align the aircraft along path 100, which has the same heading or direction as beam path 92. At this time the heading error signal as from a directional gyroscope is being amplified by amplifier 24, and the amplified version of the signal is being applied to summing point 60 through normally closed relay contacts 44, 46 and summing resistor 52, to control the aircraft in the roll axis to hold heading. A conventional radio beam responsive receiver is supplying a signal, representing the lateral displacement of the aircraft from beam path 92, to input side 14 of amplifier 12, which is being amplified, but the amplified signal, which includes a beam displacement rate component, is not being applied to summing point 60 because of normally open contacts 36, 38. Contacts 40, 42 are also open at this time. Depending upon the magnitude of the lateral displacement of the aircraft from beam path 92, the beam or lateral displacement signal may or may not have a large time rate of change as beam displacement is decreased. At relatively great distances from the beam path 92, the displacement signal is substantially constant, therefore, the time rate of change of the lateral displacement signal is substantially zero as the aircraft approaches the beam path 92.

In the early prior art it was common to use a beam displacement signal, a time rate of change of beam displacement signal, and a bank angle signal to control the aircraft in an automatic approach to the radio beam. Under these circumstances it was necessary, before applying automatic radio beam control, to insure that the aircraft was close enough to the beam laterally so that a rate signal would be developed when the aircraft in its existing heading began approaching the radio beam. If this precaution was not taken, it was possible for the craft under radio beam control to go into orbit, such as shown by path 102. This would occur because a constant bank angle causing craft change in heading would be established by the constant magnitude beam displacement signal, which was balanced out by a signal representing bank angle. To solve this orbiting problem, a heading error signal was introduced, which when added in opposition to the beam displacement signal and in reinforcement of the bank angle signal, took the aircraft out of the bank before an orbit could be established.

An approach to a radio beam using a continuous heading error signal, after the craft is placed on heading 100, might be represented by path 106. However, by using a switching technique, the angle of approach to the beam path 92 might be made much steeper by delaying the application, to control the ailerons, of the relatively steady state portion of the heading error signal during the early or initial phase of the automatic approach to beam path 92.

The detailed operation of the instant invention is as follows. After properly aligning the aircraft in the direction parallel to beam 92, the pilot would close omnicoupler engage switch 32, energizing relay 30, thereby closing contacts 36, 38 and 40, 42, and opening contacts 44, 46. This relay operation applies the beam displacement signal and the corresponding time rate of change of beam displacement signal to summing point 60 through summing resistor 48, and applies the heading error signal to summing point 60 through high-pass network 59. Network 59 blocks the D.C. and low frequency voltage components and passes the high frequency components of the amplified heading error signal. Assume at the present, with craft 98 in the position shown in FIGURE 2, that the turn is to be constant with no beam rate component present and that in the initial phases of the turn, the low frequency heading error signal is being blocked by network 59. Assume that the ailerons are deflected in response to the radio signal to cause the aircraft to go into a left bank when a displacement signal having positive polarity is applied at summing point 60. As the aircraft banks, the wiper of potentiometer 78, as operated by a bank sensing gyro, applies a signal of negative polarity representing bank angle to summing point 60 through summing resistor 50. This balances summing point 60; the ailerons are returned to streamline position and the aircraft is in a left turn at some constant bank angle. As the aircraft continues the left turn so that its heading is toward the beam, the heading error signal increases in magnitude, but it has no controlling effect on the aircraft ailerons because of the blocking action of network 59.

When the heading error voltage due to the turn reaches some predetermined amount, either diode 72 or diode 74 will break down causing the network 59 to be shunted and applying the D.C. and low frequency heading error signal to summing point 60. Assume that the amplified heading error voltage signal at output terminal 28 of amplifier 24 is negative in polarity. Diode 72 is forward biased by this signal, but diode 74 is back biased. When the varying magnitude of the negative voltage heading error reaches a predetermined amount, diode 74 will break down and the heading error signal will be applied to summing point 60 through summing resistor 54. The aircraft ailerons, due to this signal, will deflect to cause a right bank, but since the aircraft is already in a left bank it will merely return to level flight and will follow a straight path 104. This return to a straight path is shown as occurring at about point 108 on path 104. At this time the positive beam displacement signal at summing point 60 is being balanced by the negative heading error signal with the craft level.

The final phase of the automatic approach begins to occur at about point 110 in path 104, when because the positive lateral displacement signal begins to decrease positively and the time rate of change of the lateral displacement signal now becomes large enough to have a controlling effect, the angle of approach to the beam path 92 between paths 104, 92 begins to decrease or begins "washing out." Also, with decrease in angle of approach about this time, the heading error signal will fall below a certain predetermined level, diode 74 will no longer conduct appreciably, and the heading error signal will no longer be applied to the summing point 60. As the aircraft approaches beam path 92, this decrease in angle of approach or this "washing out" process becomes quite rapid because the beam displacement signal decreases and the time rate of change of lateral displacement signal, which opposes it, exceeds it.

For purposes of illustration, the oscillatory path followed by the aircraft, and which is a continuation of path 104, as shown in FIGURE 2, before actual settling down along beam path 92, is quite exaggerated, and in actual practice the first overshoot at point 112 on path 104 is relatively small, there being a negligible successive second and third overshoot.

It is understood, of course, that an approach from the opposite side of the beam path would result in the same sequence of events except that the various control signals during corresponding phases of the approach would be of the opposite polarity, and diode 72, rather than diode 74, would break down, shunting network 59, when the heading error signal reached some predetermined positive value.

It is also evident and a further feature of the invention, that in a cross-wind, proper crab-angle of the craft is attained because the long term or low frequency heading error, resulting from the crab-angle, is blocked by network 59, while the short term or transient heading error signals are passed. Under normal conditions with no transient heading error signals in following beam path 92 with a steady cross-wind prevailing, the displacement of the craft from the beam, the rate of craft displacement from the beam, and bank angle signals are the only signals having a control effect on the aircraft, relay 30 being operated at this time. If the cross wind is from the left and tends to carry the craft now aligned with path 92 to the right of the beam, any small departure of the craft from the beam will tend to turn the craft upwind, since beam displacement and beam rate are now of like sense, so that it moves toward the beam in a shallow banked turn. As the craft thus turns slowly, the directional gyro signal being of low frequency does not oppose the turn. As the beam displacement signal now decreases, the bank angle signal exceeds it, and the bank angle is reduced. When the beam displacement signal is zero, the bank angle is zero with the craft headed upwind to offset the cross-wind. Any transient heading disturbances call for aileron displacements which oppose departure of the craft from the beam.

It is understood that FIGURE 1 depicts, in general, a coupling device between sources of control signals and an aircraft flight control system or autopilot, and that the signals summed at point 60 are amplified by amplifiers 18, from which they are applied through output side 22 to the autopilot servoamplifiers.

From the foregoing specification, and by referring to FIGURE 1 and FIGURE 2 it is evident that by high-passing the heading error signal and by providing switching circuitry to shunt said network, when said heading error signal reaches a certain predetermined magnitude, such as twenty degrees, a practical and economical means for more rapidly and efficiently approaching and following a radio beam results. By automatically switching the heading error signal into the control circuitry at the optimum time, a steep approach to the path, defined by a radio beam, may be accomplished.

While the invention has been described by a specific embodiment employing electrical apparatus responsive to D.C. signals, it is obvious that technical equivalents may be used without departing from the true scope and spirit of the invention as set forth in the appended claims.

The invention therefore is to be limited only by the scope of the following claims.

I claim as my invention:

1. Apparatus for directing an aircraft on to and along a predetermined path defined by a radio beam comprising in combination with an autopilot having an aileron channel:
    a first source of signal having a polarity and magnitude dependent upon the lateral displacement of the aircraft from the beam;
    a second source of signal having a polarity and magnitude dependent upon the roll attitude of the aircraft;
    a summing network for summing the displacement and roll signals;
    a third source of signal having a polarity and a magnitude dependent upon the heading of the aircraft relative to the heading of the beam;
    a high-pass network normally transmitting a transient heading signal to the summing network; and
    means transmitting the heading signal directly to the summing network, thereby shunting the high-pass network, whenever the heading signal is greater than some predetermined amount, the summation signal being effective in controlling the aileron channel of the autopilot.

2. Apparatus for directing an aircraft on to a predetermined path defined by a radio beam comprising, in combination with an autopilot having an aileron channel:
    a first source of signal having a polarity and magnitude dependent upon the lateral displacement of the aircraft from the beam;
    a second source of signal having a polarity and magnitude dependent upon the roll attitude of the aircraft;
    a third source of signal having a polarity and and magnitude dependent upon the heading of the aircraft relative to the beam heading;
    a summing network for summing the displacement, roll, and heading signals and means in said network, transmitting low frequency heading signals to said aileron channel only when the heading signal is greater than a predetermined magnitude, but transmitting even small magnitude signals from the first and second sources.

3. Apparatus in combination with an aircraft autopilot for providing a signal to the autopilot in guiding the aircraft onto and along a predetermined path defined by a radio beam, comprising:
    a first source of signal having a polarity and magnitude dependent upon the lateral displacement of the aircraft from the beam;
    a second source of signal having a polarity and magnitude dependent upon the roll attitude of the aircraft;
    a summing network summing the displacement and roll signals;
    a third source of signal having a polarity and magnitude dependent upon the heading of the aircraft relative to the heading of the beam;
    a frequency responsive network normally transmitting the heading signal to the summing network; and
    means transmitting the heading signal directly to the summing network, thereby shunting the frequency responsive network, whenever the heading signal is greater than some predetermined amount, the summation signal being effective in controlling the autopilot to cause the aircraft to be guided along the beam.

References Cited by the Examiner

UNITED STATES PATENTS

| | | | |
|---|---|---|---|
| 2,496,809 | 2/50 | Moseley | 244—77 |
| 2,613,352 | 10/52 | Kellogg | 343—108 |
| 3,104,390 | 9/63 | Preuss | 343—107 |

FERGUS S. MIDDLETON, *Primary Examiner.*

CHESTER L. JUSTUS, *Examiner.*